H. T. GOSS.
TIME RECORDER.
APPLICATION FILED APR. 11, 1913.

1,088,148.

Patented Feb. 24, 1914.
6 SHEETS—SHEET 1.

Fig. 1.

WITNESSES

INVENTOR
Harry T. Goss.
BY
ATTORNEYS

H. T. GOSS.
TIME RECORDER.
APPLICATION FILED APR. 11, 1913.

1,088,148.

Patented Feb. 24, 1914.
6 SHEETS—SHEET 4.

WITNESSES
William P Johnson
J S Dunham

INVENTOR
Harry T. Goss.
BY
Kerr, Page, Cooper & Hayward
ATTORNEYS

H. T. GOSS.
TIME RECORDER.
APPLICATION FILED APR. 11, 1913.

1,088,148.

Patented Feb. 24, 1914.

UNITED STATES PATENT OFFICE.

HARRY T. GOSS, OF RUTHERFORD, NEW JERSEY, ASSIGNOR TO INTERNATIONAL TIME RECORDING COMPANY OF NEW YORK, OF ENDICOTT, NEW YORK, A CORPORATION OF NEW YORK.

TIME-RECORDER.

1,088,148.  Specification of Letters Patent.  Patented Feb. 24, 1914.

Application filed April 11, 1913. Serial No. 760,360.

*To all whom it may concern:*

Be it known that I, HARRY T. GOSS, residing at Rutherford, in the county of Bergen and State of New Jersey, have invented certain new and useful Improvements in Time-Recorders, of which the following is a full, clear, and exact description.

In time-recorders which print on a record-sheet the times of arrival and departure of employees it is customary to provide relative movements in two directions in the same plane, between the record sheet and the printing devices or type-wheels, one movement being at right angles to the other. Thus in the so-called "card machine", in the common form of which each workman has his own record sheet or card which is dropped into a vertical chute or receiver, the card is raised each day to bring a new horizontal day-line to the impression point and is shifted laterally at suitable times to space the "in-and-out" imprints on the particular day-line that happens to be at the printing position. In the so-called "dial machine", in the common form of which the record-sheet is wrapped around a cylindrical drum and bears the records of a plurality of workmen, the drum is rotated on its axis to bring the different workmen's record-lines to the printing point, and the drum or the printing wheels are shifted at the proper times in a direction parallel to the drum's axis to space the in-and-out imprints. By such method as the above the times of arrival and departure of the employees are kept separate and distinct on the record sheet, and the workman's pay is therefore calculated on the basis of a record which he himself makes and which is constantly open to his inspection. If the workman arrives late or departs early, the fact appears in the record and the exact time he was at work can be deduced. This involves scrutiny of each imprint, to see if it is late or early, or, in other words, "irregular"; and as such examination of each imprint consumes considerable time in the aggregate, particularly if the number of records to be examined is large, it has been proposed to print regular and irregular registrations with distinctive characteristics, as for example by printing the regular or on-time registrations in blue, and the irregular or late-arrival and early-departure registrations in red. Then a mere glance at the workman's record is sufficient to show whether on any day he arrived late or left early. That invention, described in U. S. Letters Patent of Dey, No. 786,011, has gone into extensive use and has proved to be of great practical value.

My present invention is designed to provide a time recorder which shall make the regular and irregular registrations sharply distinctive, without, however, the necessity of printing them in different colors. For this purpose the machine is so constructed and organized that the regular and irregular registrations are printed on different parts of the record-sheet, with the result that a glance at the record, as in the case of the two-color scheme, will show whether the workman has been absent or irregular within the period covered by the record.

To this and other ends the invention consists in the novel features of construction and combinations of elements hereinafter described.

The invention is applicable to a great variety of time recorders, but in the accompanying drawings I have shown only one embodiment of the invention, applied to a card machine of the type described in the prior patent of C. E. Larrabee, No. 935,312, issued September 28th, 1909.

Referring now to the drawings.

In the machine illustrated, the record-sheet support is in the form of an open-topped receiver or chute 10 having its central portion open to permit the printing hammer 11 to strike the record-sheet or card against the ink ribbon 12 and the time-printing devices indicated by the wheels 13. The latter are clock-driven in any convenient and suitable manner, and as driving mechanisms of various kinds for such purpose are common and well known in the art it is unnecessary to illustrate the same. The printing hammer 12 is pivoted at its lower end in a bifurcated carrier 14 and is normally held with its resilient face 15 out of contact with the record card in the chute 10 by a coil spring 16. The carrier 14 is fixed on a transverse rock-shaft 17, and to the latter is fixed the operating handle 18 projecting forwardly through the front of the casing 19. When the operating handle is depressed the hammer 12 is retracted; then when the handle is released the spring 20, connected to an arm 21 fixed to the shaft, rocks the shaft until the arm 22 depending from the handle 18 comes against the adjustable stop 23. This arrests the shaft and handle, but the momentum of the heavy hammer 12 carries the latter against the record card, from which the hammer is caused to rebound by the tension of spring 16.

Figure 2:
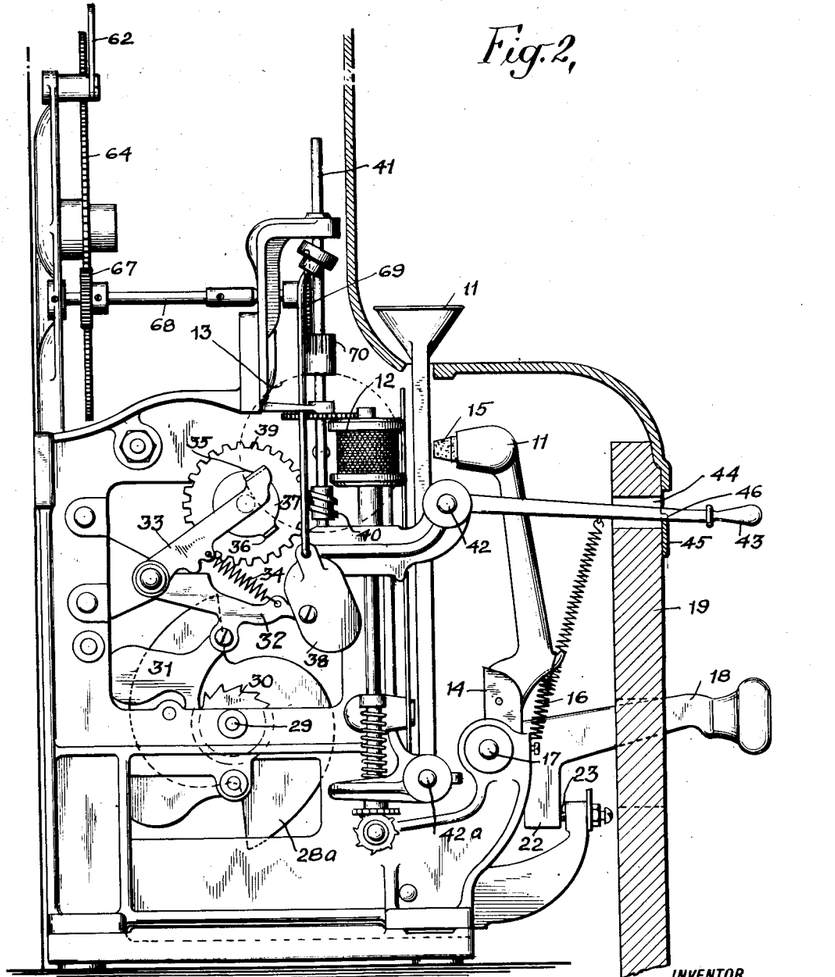
Fig. 2 is a side view, showing the casing in vertical section.

As previously stated, the record-sheet or card used with time-recorders of the particular kind illustrated is raised from day to day to bring the appropriate day lines to the printing position. Instead of effecting this operation by raising the entire chute or receiver it is customary to adopt the equivalent construction, in which body of the chute is vertically stationary and merely its bottom is vertically adjustable. For this purpose the bottom is in the form of a small plate or "abutment" 24 (Fig. 3) on the forward end of a lever 25 fulcrumed loosely at its rear end on a short transverse shaft 26. This lever has a lateral stud 27 bearing on the upper edge of a cam 28 on a shaft 29, so that as the cam revolves (step-by-step) the lever will be raised and the card lifted to the extent of one step at each actuation of the cam. In the machine illustrated the cam has two spiral arms 28ª, and makes a half-revolution every seven days. To rotate the cam the shaft 29 is provided with a ratchet wheel 30 (shown in Fig. 2) coöperating with a pawl 31. The latter is pivoted to an arm 32 pivoted to the frame of the machine. At the same point is pivoted an arm 33, the two arms being also connected by a coil spring 34. The arm 33 has at its free end a lateral finger 35 in the path of a lug 36 on a rotating disk 37, so that once in each revolution of the latter the lug will lift the arm 33 and then release the same. This first swings the arm 32 upwardly, retracting the pawl 31 over the ratchet 30, then permits the weight 38, connected to the free end of the arm 32, to carry the pawl down again. The shaft 29 and cam 28 are thus given a step-by-step rotation. The disk 37 is itself given a continuous movement of rotation by a worm gear 39 fixed to the disk and meshing with a worm 40 on a vertical shaft 41. The latter is connected with and driven by a clock in any convenient manner (not shown), and the proportions of the parts are such that the disk rotates once every twenty-four hours. The lift of arm 33 by the lug 36 being sufficient to retract the pawl 31 over one tooth on the ratchet 30, and the latter having fourteen teeth it will be seen that the cam 28 is given one-fourteenth of a revolution each day.

For the purpose of spacing the "in-and-out" records laterally on the record card, the receiver 10 is mounted to slide back and forth past the impression point on a pair of horizontal rails 42, 42ª. Usually this lateral movement of the record-sheet support is controlled by the clock, as for example in the manner described in the aforesaid patent of C. E. Larrabee. In order to simplify the present drawings and specification as much as possible, I have shown only manually operated means for the purpose, said means comprising a handle 43 extending forwardly from the receiver 10 and through a wide horizontal slot 44 in the front of the casing 11. Below the slot is an index plate 45 provided on its upper edge with a series of notches 46 corresponding to the several positions of the receiver and adapted to receive and hold the handle 43 with the chute 10 in proper position. When it is desired to shift the receiver the handle 43 is lifted out of the notch engaging it, the handle being pivotally connected with the receiver to permit the necessary lifting.

Figure 1:
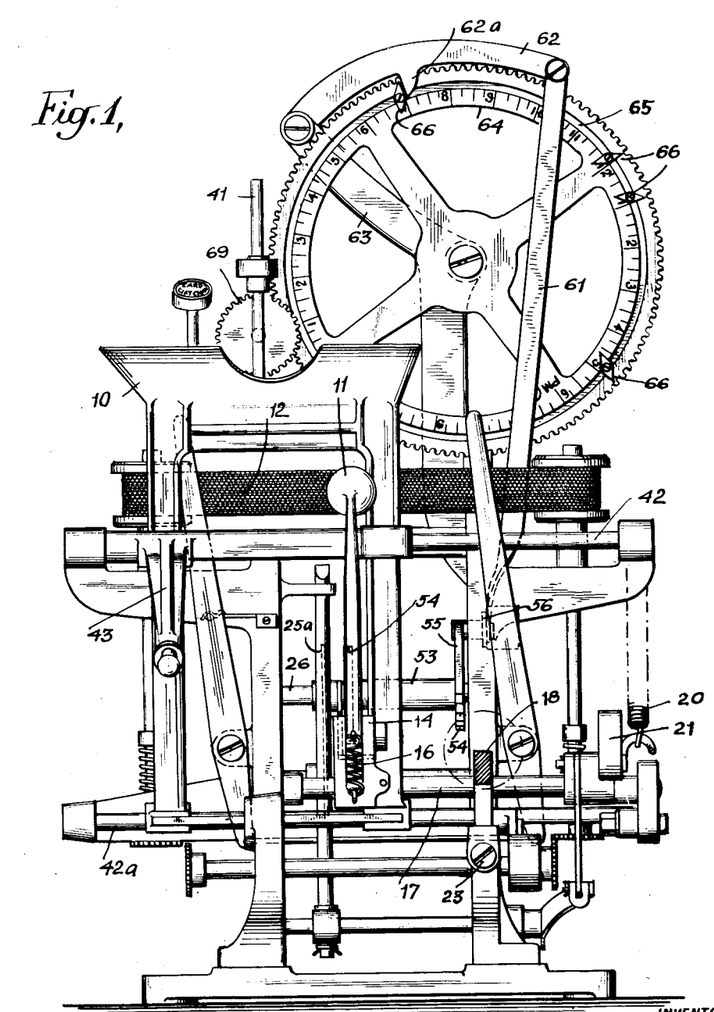
Figure 1 shows the machine in front elevation, without the clock and the usual inclosing casing.
Figure 7:
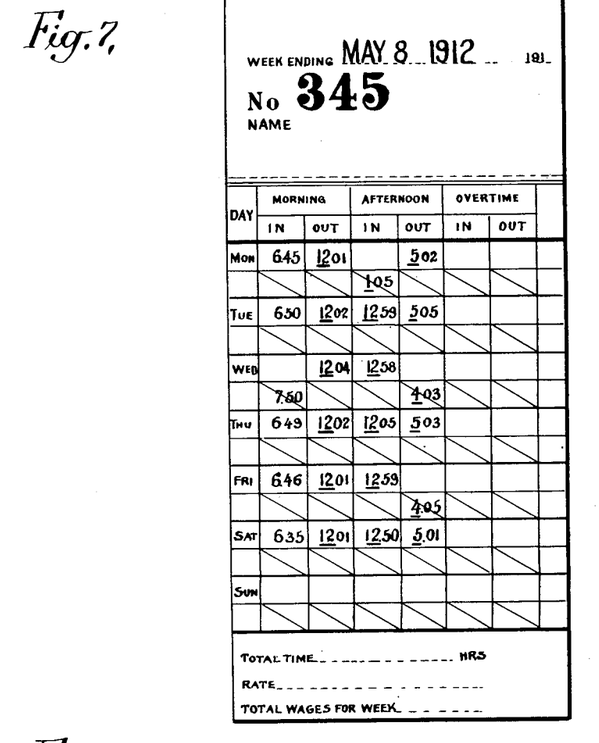
Fig. 7 shows a time-record card as printed by the particular machine described herein.

The record made by the time-recorder illustrated is shown in Fig. 7. When the workman registers at or before the time at which the period of work begins, and at or after the end of the period, the corresponding imprint is made on the day-line designated Monday, or Tuesday, etc., as the case may be, and in the appropriate vertical column. These are the "regular" registrations, and the spaces therefor may be conveniently termed regular spaces. On the other hand, if the workman arrives late or departs early, the registrations are "irregular" and are made in the same columns, but on the line below the regular registrations, in the spaces marked with diagonal lines to aid in distinguishing them from the regular spaces. This necessitates raising and lowering the record-sheet or card a fraction of a step at appropriate times during the day, so as to bring the irregular day lines to the printing position, and for such purpose the following mechanism is provided: Instead of being in one piece, as is usual, the abutment or card-lift lever 25 is made in two parts, 25ª, 25ᵇ, pivoted together at 50. The latter part is the one which is fulcrumed on the shaft 26 and carries the stud 27; while the part 25ᵃ has a downwardly inclined rear portion provided with a stud 51 extending laterally into coöperation with the lower edge of a cam 52 fixed to a sleeve 53 which is rotatably mounted on the shaft 26. This cam is provided with a suitable number of rises and drops. In the position shown in full lines in Fig. 3 the stud 51 lies in the drop 52ʰ and the abutment 24 stands at the Monday "regular" position; but one-eighth of a revolution of the cam counterclockwise will bring the rise 52ᵃ into coöperation with the stud, thereby swinging the part 25ᵃ of the abutment lever 25 on the pivot 50 to the "irregular" position shown in dotted lines, such movement of the lever-part 25ᵃ being independent of the part 25ᵇ. Assuming that this movement of the cam 52 occurred at 7.00 a. m., all morning-in and morning-out registrations thereafter will be made in the "irregular" spaces below the regular spaces on the workman's cards, up to the end of the morning period of work, for example 12.00 m. At this time the cam is given another eighth of a revolution, which brings drop 52ᵇ over the stud 51 and restores the abutment 24 to the regular position. After the beginning of the afternoon period the cam 52 is given another one-eighth of a revolution, thereby bringing the rise 52ᶜ over the stud and raising the abutment or card-lift to the irregular position again so that thereafter the afternoon-in and afternoon-out registrations will be printed on the "irregular" line. At the end of the afternoon period the one-eighth revolution then given to the auxiliary cam 52 brings the drop 52ᵈ over the stud and lowers the abutment again to the regular position. After the "overtime" period begins the rise 52ᵉ is brought over the stud, which raises the abutment to the irregular position, for the printing of irregular overtime-in and irregular overtime-out registrations on the irregular line. At the end of the overtime period a similar movement of the cam brings the drop 52ᶠ over the stud 51, restores the abutment to the regular position. This may complete the cycle, as explained hereafter, but, as in the case where the work of the establishment goes on all night and all day, a fourth rise 52ᵍ may be provided to take care of the irregular-in and irregular-out registrations of such fourth period. To rotate the auxiliary cam 52 in the proper direction a ratchet wheel 54 (Figs. 4 and 5) is provided, fixed to the sleeve 53 to which, it will be remembered, the said cam is also fixed. A pawl 55 coöperates with the ratchet and is pivotally mounted on a horizontal arm 56 pivoted to the frame of the machine at 57. The arm is urged downwardly with sufficient force to actuate the ratchet and the cam 52 by a weight 58, and its downward movement is limited by a stop 59ᵃ in the frame of the machine and against which lever 56 rests when in its lower position, see Fig. 5. A holding pawl 60 prevents reverse movement of the ratchet 54 and cam 52 during retraction of the pawl 55. To retract the actuating pawl 55 the arm 56 is connected by a vertical link 61 to one end of a horizontal lever 62 fulcrumed at its other end to a fixed standard 63, so that when the lever 62 is raised it will lift the arm 56. Adjacent to the last named lever is a large gear wheel 64 (Figs. 1 and 2) having near its periphery a circular groove 65 in which a suitable number of lifters 66 are adjustably mounted in any convenient manner. These lifters coöperate, successively, with the finger 62ᵃ on lever 62 to cam the latter upwardly. As the lifters (moving in the counterclockwise direction as seen in Fig. 1) pass the finger the lever is permitted to drop, thereby allowing the weighted arm 56 to advance the pawl 55 and turn the ratchet 54 and cam 52; it being understood that the proportions of the coöperating parts, and the position of the finger 62ᵃ on the lever 62, are such that the rise of the lever due to the passing of a lifter is sufficient in extent to retract the pawl 55 over a space slightly more than one but less than two teeth on the eight-toothed ratchet 54. This gear wheel meshes with a small gear 67 fixed on the rear end of a forwardly extending shaft 68 having at its front end a gear 69 meshing with a pinion 70 on the vertical shaft 41, which, it will be remembered, is driven by the clock (not shown). While the rate at which the time-driven wheel 64 rotates is immaterial, the number and positions of the lifters 66 being determined by the rate of rotation of said wheel, I prefer to have it rotate once in twenty-four hours, in which case the total number of lifters 66 is in general equal to the number of steps required by the auxiliary cam 52 in the course of the day. The times at which the cam is actuated depend of course upon the positions of the lifters on the gear, and for convenience in adjusting the lifters to the proper positions, so that the actuations of the cam 52 will occur at the proper times, the gear may be provided with time-graduations, as shown in Fig. 1. In this figure four lifters are shown, the first being at 7.00 a. m., so that at that time the abutment 24 will be raised to the irregular position. The second lifter is arranged at 12.00 m., to restore the abutment to regular position, for regular morning-out and afternoon-in records. At 1.00 p. m. is the third lifter, which causes the cam 52 to raise the abutment to the irregular position, for irregular afternoon-in and afternoon-out registrations. The fourth lifter is located at 5.00 p. m., to again restore the abutment to the regular position, so that regular afternoon-out records will be made in the regular line. If the cycle started with the drop 52ʰ in operative position over the stud 51, the last movement mentioned above would leave the drop 52ᵈ over the stud. No more lifters being provided, the cam would stay in said last position till the 7.00 a. m. lifter actuated it. This time the first irregular positioning of the abutment would be effected by the rise 52ᵉ, after which the other rises and drops would follow in regular order. Then on the third day the cycle would again begin with the drop 52ʰ, and the first irregular adjustment would be accomplished by the rise 52ᵃ. If an overtime period of work is to be accounted for a fifth lifter (not shown) is provided at the hour at which the period begins, to raise the abutment so that irregular overtime-in and overtime-out imprints will be made on the irregular line, and a sixth lifter (not shown) is arranged at the end of the period to restore the abutment to the position required for regular overtime-out and regular morning-in registrations.

Figure 3:
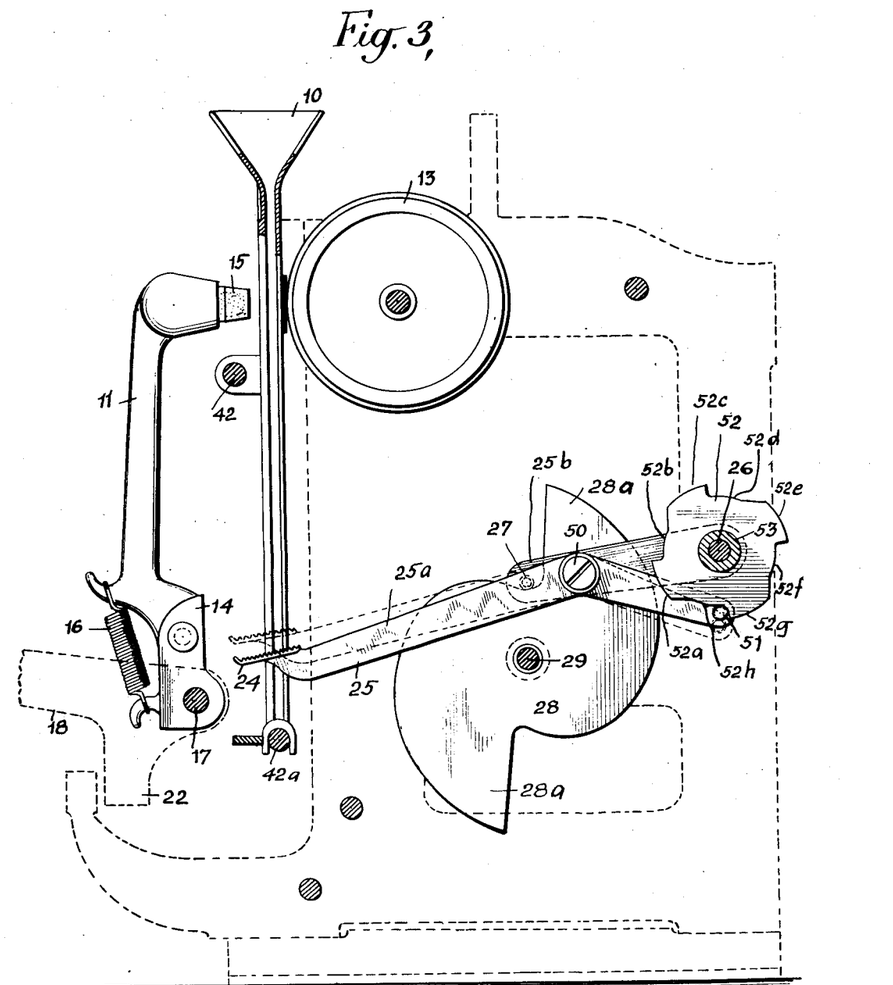
Fig. 3 is a detail central section on a larger scale than that of Fig. 2 and looking from the other side of the machine.
Figures 4, 5:
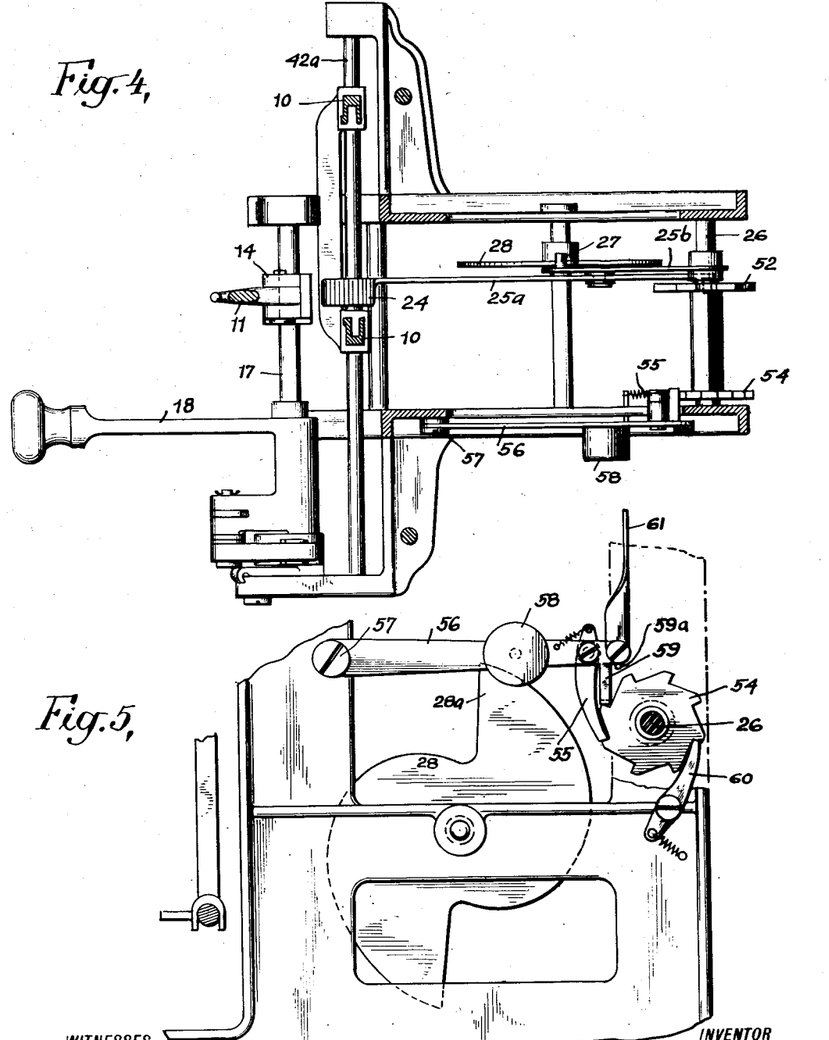
Fig. 4 is a sectional plan view of the parts shown in Fig. 3, on line 4—4.
Fig. 5 is a detail side view of the mechanism for actuating the auxiliary setting-cam.

From the above it will be seen that in the particular machine illustrated the number of steps taken by the auxiliary cam 52 every twenty-four hours is even, and that each step must be sufficient in extent to carry the next rise (or drop, as the case may be) into coöperation with the abutment lever. At the end of each day the two-armed cam 28 is given a fourteenth of a revolution (clockwise as seen in Fig. 3), which raises the pivot 50 connecting the two parts 25ᵃ and 25ᵇ of the abutment lever 25. Since the part 25ᵃ cannot rock counterclockwise on said pivot, being held against such movement by the cam 52 coöperating with the stud 51, the aforesaid lift of the pivot 50 raises the lever 25 as a whole on the shaft 26 as a whole and at the same time shifts the stud 51 slightly to the left from its former position. As there are six shifts of this character given to the stud in the course of a week it will be seen that each rise and each drop on the cam 52 must have sufficient dwell to accommodate the travel of the stud without the rises and drops getting out of step with the lifters 66. With an abutment lever 25ᵃ—25ᵇ having the proportions shown in Fig. 3, as regards the length of the parts and the positions of the studs 27, 51, and the pivot 50, and with the cam 28 having the configuration and relative size indicated, the extent of the dwell required for each rise and each drop on the cam 52 is such that no more than four rises (and of course the same number of drops) can be provided on said cam. At the end of the work the seventh movement of cam 28 restores the parts to the initial positions shown in Fig. 3.

Figure 6:
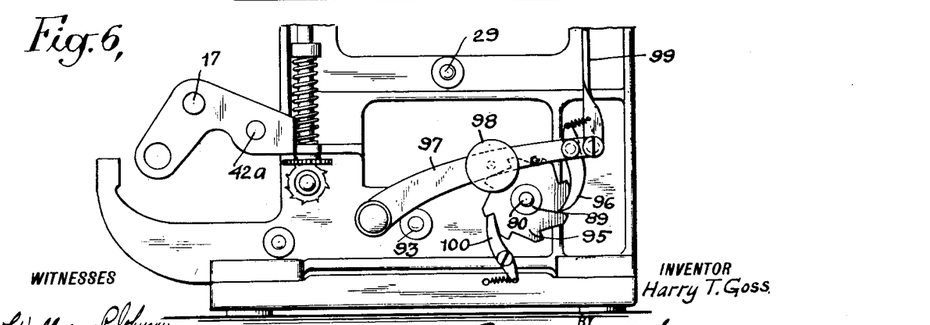
Fig. 6 is a similar view of a modification.
Figure 8:
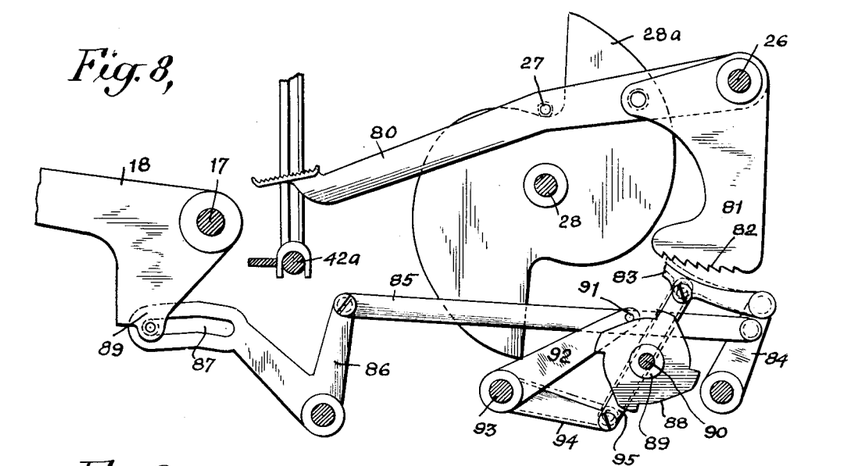
Fig. 8 is a detail side view of a modified form of mechanism for shifting the record-sheet or card at "irregular" times.
Figure 9:
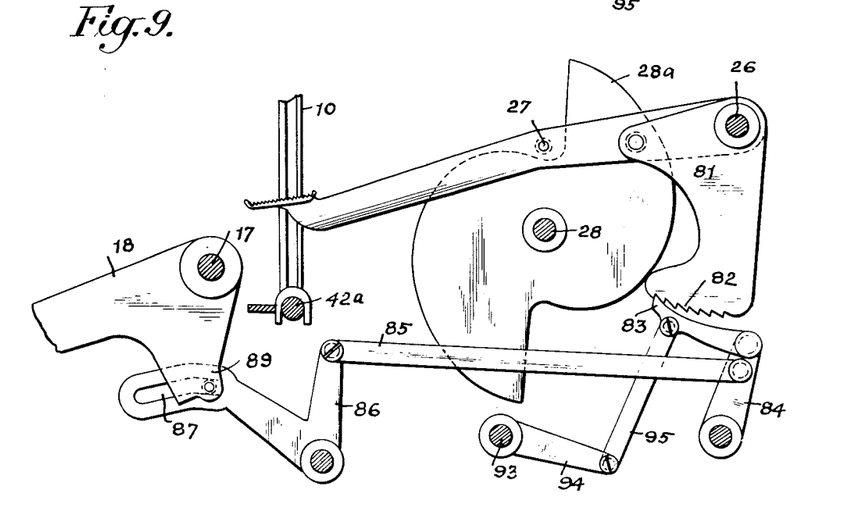
Fig. 9 is a similar view of certain parts illustrated in Fig. 8, but showing them in a different operative position.

In the modification illustrated in Figs. 6, 8, and 9, the abutment lever 80 is not made in two relatively movable parts but at its rear it has fixed to it a depending arm 81 terminating in an arc-shaped ratchet 82. Below the ratchet is a forwardly extending pawl 83 pivoted at its rear end to the top of a rock-arm 84 connected by a long link 85 to one arm of a V-shaped bell crank lever 86. The other arm of the lever 86 has a slot 87 to receive a lateral stud 88 on an arm 89 depending from the operating or printing handle 18. It will therefore be seen that when the handle 18 is depressed to make an imprint the first effect is to rock the lever 86 counter-clockwise. This advances the pawl 83; and if the pawl were at that time in engagement with a tooth on the ratchet 82 the advance of the pawl would swing the abutment lever 80 clockwise on the shaft 26 and raise the abutment 24 to the irregular position, as in Fig. 9. On the other hand, if the pawl were in its lower position its advance by the handle 18 would simply be idle and would leave the abutment at the regular position. The positioning of the pawl 83 into and out of coöperation with the ratchet 82 is effected by a cam 88 fixed to a sleeve 89 rotatably mounted on a short transverse shaft 90 suitably supported at the bottom of the machine. This cam coöperates with a stud 91 on a rock-arm 92 fixed to a shaft 93 which also has fixed to it a second rock-arm 94, the two arms 92, 94, constituting in effect a bell-crank lever. The latter is connected to the pawl 83 by a short link 95. As the cam rotates (step-by-step) at appropriate times it swings the bell-crank lever 92—94 counterclockwise and hence raises the pawl 83 into engagement with the ratchet 82. The mechanism provided for actuating the cam 88 is similar to that employed in conjunction with the cam 52, and is shown in Fig. 6. The eight-toothed ratchet 95 is fixed to the sleeve 89, and coöperates with a pawl 96 pivoted on the horizontal lever 97 which carries an actuating weight 98. The lever itself is actuated by a vertical link 99, which is reciprocated by lifter mechanism (not shown in Fig. 6) exactly like that illustrated in Fig. 1, namely, the lever 62, gear 64, and lifters 66, the lifters of course being arranged to effect the actuation of the cam 88 at the times when the card abutment is to be raised and lowered. A holding pawl 100 prevents reverse movement of the ratchet 95 during retraction of the actuating pawl 96. In the construction illustrated in Figs. 8 and 9, as in that shown in Figs. 1 to 5, the cam 28 is actuated once each day. To accommodate this daily shift of the card abutment the ratchet 82 has seven teeth, so that as the arm 81 changes its position one or another of the ratchet teeth will always be in position for engagement by the pawl 83.

From the foregoing it will be seen that my invention provides simple and reliable means for printing "regular" and "irregular" registrations on different portions of the record card, thereby making the two classes distinguishable without requiring scrutiny of each imprint. Moreover, the invention can be applied to existing card-recorders, particularly two color card-recorders, with very little alteration therein. In the latter case the mechanism for shifting the ribbon to print the irregular registrations in a different color can be utilized for actuating the cam (52 or 88 herein) which shifts the card-abutment to the irregular position.

It is to be understood that the invention is not limited to the particular constructions herein described, but can be embodied in other forms without departure from its proper spirit and scope as defined by the appended claims.

What I claim is:

1. In a time-recorder adapted to print regular and irregular registrations on different portions of a record-sheet, the combination of printing devices, a record-supporting device arranged to present the record-sheet to the printing devices, time-controlled means to shift the supporting device from day to day in the same path to present fresh day-spaces on the record sheet to the impression point, and time-controlled means to shift the supporting device back and forth in the aforesaid path a plurality of times each day.

2. In a time-recorder adapted to print regular and irregular registrations on different portions of a record sheet, the combination of a printing mechanism, a support to hold the record-sheet in operative relation to the printing mechanism, and time-controlled devices to shift the support day-by-day in the same path to present fresh day-spaces on the record-sheet to the impression point and back and forth in the aforesaid path a plurality of times each day.

3. In a time recorder adapted to print regular and irregular registrations on different portions of a record card, the combination of printing devices, time-controlled means for raising the card one step each day, and time-controlled means for raising and lowering the card a fraction of a step a plurality of times each day.

4. In a time-recorder adapted to print regular and irregular registrations on different portions of a record-sheet, the combination of printing means to operate on a vertically arranged record-sheet, and time-controlled means to raise the record-sheet a whole step once each day and to raise and lower the card a fraction of a step a plurality of times each day.

5. In a time-recorder adapted to print regular and irregular registrations on different portions of a record-sheet, the combination of printing mechanism, means for shifting the record sheet from day to day in the same path to present fresh day-spaces on the record-sheet to the impression point, and time-controlled means for raising and lowering the record-sheet in the aforesaid path a plurality of times each day.

6. In a time-recorder adapted to print regular and irregular registrations on different portions of a record-sheet, the combination of printing mechanism, means for raising the record sheet once each day to present fresh day-lines to the impression point, means for shifting the record sheet laterally to space the in-and-out registrations on the record-sheet, and time-controlled means for raising and lowering the record sheet a plurality of times each day to present irregular and regular portions of the day-line to the impression point.

7. In a time-recorder adapted to print regular and irregular registrations on different portions of a record-sheet, the combination of a card-lift, time-controlled mechanism to raise the card-lift one step each day, a cam associated with the card lift to raise and lower the same a fraction of a step independently of the aforesaid mechanism, and time-controlled means to actuate the cam a plurality of times per day.

8. In a time-recorder adapted to print regular and irregular registrations on different portions of a record-sheet, the combination of a card-lift or abutment, a lever on which the card-lift is mounted, a cam associated with the lever to actuate the same and raise the card one step each day, time-controlled means to actuate the cam, a second cam associated with the lever to raise and lower the same and the card-lift independently of the first cam, and time-controlled means to actuate the second cam.

9. In a time-recorder adapted to print regular and irregular registrations on different portions of a record-sheet, the combination of a card-lift, a lever supporting the same, means for raising the lever a whole step once each day, and time-controlled means for raising and lowering the lever a fraction of a step a plurality of times per day, including adjustable devices for determining the times at which the last-named means operates.

10. In a time-recorder adapted to print regular and irregular registrations on different portions of a record-sheet, the combination of a card-lift lever composed of two parts pivoted together, a fulcrum on which the lever swings as a whole, means for raising the lever about said fulcrum, and time-controlled means for raising and lowering one of said parts about its pivotal connection with the other.

11. In a time-recorder adapted to print regular and irregular registrations on a record-sheet, the combination of a card-lift lever composed of two parts pivoted together, a clock-driven cam to raise the lever as a whole, and a clock-driven cam to raise and lower one part of the lever independently of the other.

12. In a time-recorder adapted to print regular and irregular registrations on different portions of a record, the combination of a card-lift, mechanism for raising the card-lift a whole step at a time, and means for raising and lowering the card lift a fraction of a step independently of the first-named movement, said means including a clock-driven wheel, a plurality of devices adjustably mounted on said wheel, and a lever actuated by said devices.

13. In a time-recorder adapted to print regular and irregular registrations on different portions of a record-sheet, the combination of a card lift, means for raising the card-lift a whole step at a time, and means for raising and lowering the card-lift a fraction of a step, including a cam connected with the card-lift, a lever associated with the cam to rotate the same step-by-step, a clock-driven wheel and a series of lifters adjustably mounted on the wheel to engage and actuate the lever.

14. In a time-recorder adapted to print regular and irregular registrations on different portions of a record-sheet, the combination of a card-lift lever composed of two parts pivoted together, a fulcrum on which the lever swings as a whole, a clock-driven cam associated with the lever to swing the same as a whole on said fulcrum, a cam associated with one part of the lever to swing the same on its pivotal connection with the other, a ratchet connected with the cam to rotate the same, and means for rotating the ratchet, comprising a clock-driven wheel, a series of lifters on the wheel, a lever actuated by the lifters, a lever having a pawl coöperating with the ratchet, and a link connecting the first lever with the second.

In testimony whereof I affix my signature in the presence of two subscribing witnesses.

HARRY T. GOSS.

Witnesses:
N. LAWSON DYER,
S. S. DUNHAM.